United States Patent
Parvin et al.

(10) Patent No.: US 6,740,887 B1
(45) Date of Patent: May 25, 2004

(54) APPARATUS AND METHODS FOR INVESTIGATION OF RADIOACTIVE SOURCES IN A SAMPLE

(75) Inventors: Daniel Francis Parvin, Cumbria (GB); John Paul Ronaldson, Cumbria (GB)

(73) Assignee: British Nuclear Fuels PLC, Warrington (GB)

(*) Notice: Subject to any disclaimer, the term of this patent is extended or adjusted under 35 U.S.C. 154(b) by 0 days.

(21) Appl. No.: 09/889,186

(22) PCT Filed: Jan. 11, 2000

(86) PCT No.: PCT/GB00/00009

§ 371 (c)(1),
(2), (4) Date: Oct. 10, 2001

(87) PCT Pub. No.: WO00/42447

PCT Pub. Date: Jul. 20, 2000

(30) Foreign Application Priority Data

Jan. 11, 1999 (GB) ............................................. 9900448
Jan. 11, 1999 (GB) ............................................. 9900449

(51) Int. Cl.⁷ ............................................. G01T 1/167
(52) U.S. Cl. ..................................... 250/393; 250/394
(58) Field of Search ............................. 250/393, 394, 250/363.04, 358.1, 360.1, 252.1, 370.01, 506.1, 336.1; 382/131, 128

(56) References Cited

U.S. PATENT DOCUMENTS

| 5,155,365 A | | 10/1992 | Cann et al. |
| 5,274,239 A | * | 12/1993 | Lane et al. ............. 250/370.01 |
| 5,750,991 A | | 5/1998 | Moyers et al. |
| 6,310,968 B1 | * | 10/2001 | Hawkins et al. ............. 382/131 |
| 2002/0125439 A1 | * | 9/2002 | Caldwell et al. ............. 250/395 |
| 2002/0175288 A1 | * | 11/2002 | Taleyarkhan ............. 250/358.1 |

FOREIGN PATENT DOCUMENTS

| JP | 62-91879 | 4/1987 |
| WO | WO 00/42446 | 1/2000 |

OTHER PUBLICATIONS

"Standard Test Method for Nondestructive Assay of Special Nuclear Material in Low–Density Scrap and Waste by Segmented Passive Gamma–Ray Scanning," Sep. 1996, American Society for Testing and Materials.

"Standard Test Method for Nondestructive Assay of Special Nuclear Material in Low Density Scrap and Waste by Segmented Passive Gamma–Ray Scanning," Nov. 1989, American Society for Testing and Materials.

Parker et al., "Transmission Measurement Correction for Self–Attenuation in Gamma–Ray Assays of Special Nuclear Materials," 1976, Nuclear Materials Management.

* cited by examiner

Primary Examiner—Constantine Hannaher
Assistant Examiner—Otilia Gabor
(74) Attorney, Agent, or Firm—Beyer Weaver & Thomas LLP

(57) ABSTRACT

The present invention provides an improved method for investing radioactive sources which takes into account variations in the materials potentially making up the samples. In particular, the invention provides a method of investigating radioactive sources in a sample, the method comprising detecting a portion of the emissions arising from the sample at an energy, the detected portion relating to a detected level, the detected being corrected according to a correction method to give a corrected level at that energy. The invention also provides improved transmission sources and improved transmission based correction techniques for use in investigating radioactive sources in a sample.

17 Claims, 2 Drawing Sheets

APPARATUS AND METHODS FOR INVESTIGATION OF RADIOACTIVE SOURCES IN A SAMPLE

This invention is concerned with improvements in and relating to apparatus and methods for materials investigations. The invention is particularly, but not exclusively, concerned with investigating gamma ray emissions from materials. The invention is still more particularly, but not exclusively, concerned with correction techniques including the provision of more suitable transmission sources and an improved correction technique.

In a variety of situations it is necessary to investigate emissions from radioactive sources in or on materials to form a basis for a variety of subsequent decisions, actions or further considerations. The investigations of the sample may relate directly to the emission, for instance the emission source, or indirectly, for instance the consideration of associated non-emitters or emitters which are not directly measurable. The emissions of interest are in particular gamma ray emissions, but other emission forms may be considered additionally or alternatively.

Emission investigation is particularly important in waste evaluation cases. For a given waste sample it is desirable to be able to determine a variety of unknowns. The unknowns may include, but are not limited to, one or more of the level, type, constituents, nature and distribution of the emissions, emission sources, associated materials or associated factors.

As well as simply using the results obtained from the detectors, emission count rates for the radioactive materials in the sample under consideration, it is known to investigate to an extent the effects of the all the material in a sample, through their effect on the transmission of external emissions from an applied source through the sample to the detectors.

The applicant has determined that such simple sources are not suitable for transmission based investigation and correction at the full variety of energies and with the full variety of materials. As a consequence the effectiveness of the correction technique based on these investigations is impaired.

The present invention seeks to provide a more widely accurate transmission based correction, which is also simple and easy to use across a full spread of situations which are encountered in practice.

In addition the existing transmission based correction techniques only go part way to account for the variables which affect the detected counts for the sources of the sample itself and as a result the correction technique is not fully effective.

The present invention has amongst its aims the provision of a more accurate and thorough correction technique based on transmission correction and the manner in which it is employed.

According to a first aspect of the invention we provide a method of investigating radioactive sources in a sample, the method comprising detecting a portion of the emissions arising from the sample, and further comprising the provision of a radioactive generator, passing at least a portion of the emissions of the generator into the sample, detecting at least a portion of the emissions from the generator leaving the sample, the radioactive generator emissions being of at least a plurality of emission energies and at least two of those energies being detected.

Preferably the method further provides that the detected portion of the source emissions relate to a detected level for the sources in a sample, the detected level being corrected according to a correction method to give a corrected level for the sources in a sample, the process being repeated for one or more other samples.

Preferably the correction method employs measured transmission coefficients in determining the correction. The measured transmission coefficients, for one or more of the energies, most preferably all, may be provided according to the equation:

$$\text{Trans. Coeff.} = \frac{R}{R_o}$$

where $R$ is the rate of detected photons with the sample in place, $R_o$ is the rate of photons which would be detected without the sample in place.

Preferably the density determined is used as a factor in the correction method. The density used in the correction method may be an averaged density from the determinations or a weighted average density from the determinations.

For correction of source emission energies corresponding to a generator energy preferably the measurement based correction factor is used. For correction of source emission energies not corresponding to a generator energy preferably the correction factor is based on the extrapolation of the correction factors based on the measurements.

The generator is preferably a single isotope. Preferably the emission energies extend across a substantial portion of the range of energies emitted from the sample. A substantial portion may be 50%, preferably 75%, more preferably 90% and ideally 100% of the sample energies range. The generator most preferably of all emits energies encompassing the range of energies emitted by the sample. $^{152}$Eu is a particularly preferred generator. Preferably at least 5 energies from the source are detected and used, more preferably at least 8 energies are detected and used.

Preferably the portion of generator emissions detected have passed through the sample. Preferably the generator is provided on the opposing side of the sample to the detectors, most preferably in direct opposition.

One or more of the detectors for the sources may be used for detecting the generator emissions and/or vice-versa.

According to a second aspect of the invention we provide apparatus for investigating radioactive sources in a sample, the apparatus comprising:
one or more detectors for emissions from the sources, the detectors generating signals indicative of the emissions detected;
an investigating location into which the sample is introduced;
signal processing means for relating the detector signals to one or more characteristics of the sources;
a radioactive emission generator separate from the sample; and
one or more detectors for emissions from the radioactive generator leaving the sample;
wherein the radioactive generator emissions are of at least a plurality of energies and a least two of the plurality of energies are detected.

The source detectors and the generator detectors may be one and the same in the case of one or more or all of the detectors.

The second aspect of the invention may include any of the features, options and possibilities set out on the first aspect of the invention, including apparatus suitable for the implementation of the method steps detailed therein.

According to a third aspect of the invention we provide a method of investigating radioactive sources in a sample, the method comprising detecting a portion of the emissions arising from the sample at an energy, the detected portion relating to a detected level, the detected level being corrected according to a correction method to give a corrected level, at that energy, the correction method including:

the provision of an emission generator, passing at least a portion of the emissions of the generator into the sample, detecting at least a portion of the emissions from the generator leaving the sample, and determining a value for a first relationship between the two portions;

calculating a value for a relationship of equivalent type to the first, the calculation being based on functions of an element's absorption of emissions and the amount of that element potentially encountered by emissions, for one or more elements;

adjusting one or more variables/functions in the calculated relationship to reduce the difference between the value of the determined relationship and the value of the calculated relationship for the sample at a plurality of the energies of emissions from the generator; and obtaining the values of the calculated relationship functions from the reduction and calculating the calculated relationship from those factors at the sample source emission energy requiring correction and correcting the detected level using those values.

Preferably the generator emissions are of at least two emission energies, ideally multi-energy emissions are provided, and/or with at least two of those energies being detected.

The generator is preferably a single isotope. Preferably the emission energies extend across a substantial portion of the range of energies emitted from the sample. A substantial portion may be 50%, preferably 75%, more preferably 90% and ideally 100% of the sample energies range. The generator most preferably of all, emits energies encompassing the range of energies emitted by the sample. $Eu^{152}$ is a particularly preferred generator.

Preferably the portion of generator emissions detected have passed through the sample. Preferably the generator is provided on the opposing side of the sample to the detectors, most preferably in direct opposition.

One or more of the detectors for the sources may be used for detecting the generator emissions and/or vice-versa.

Preferably the first relationship employs measured transmission coefficients, and ideally comprises measured transmission coefficients. The measured transmission coefficients, for one or more of the energies, most preferably all, may be provided according to the equation:

$$\text{Trans. Coeff.} = \frac{R}{R_o}$$

where R is the rate of detected photons with the sample in place, $R_o$ is the rate of photons which would be detected without the sample in place.

Preferably the calculated relationship is based on functions addressing one or more of the density, emission path length in the sample and sample absorption of emissions. Preferably the calculated relationship is based on functions addressing one or both of the effect of the material forming the sample over the emission path length in the sample and the sample absorption of emissions.

The calculated relationship is preferably based on the equation:

$$T_i = \exp(-\Sigma q_j \cdot \mu_{i,j})$$

where $T_i$ is the transmission coefficient at the energy i under consideration; $q_j$ is the effective material thickness or the effect of the specified material forming the sample over the specified emission path length through the sample, for element j; $\mu_{i,j}$ is the mass absorption coefficient for elements j at energy i. The sum including all of the specified elements, j, included in the method.

Preferably the calculated relationship includes contributions from two or more elements, and most preferably three or more. The elements may be elements in the sample, likely to be in the sample, unknown or not in the sample.

Most preferably the elements include at least one low atomic mass element, preferably less than 10 and ideally less than 5. Preferably the elements include at least one high atomic mass element, preferably greater than 40 and ideally greater than 50. Preferably the elements include at least one intermediate atomic mass element, preferably between 10 and 50 and ideally between 10 and 40. Ideally at least one element from each category is provided.

Preferably the adjusting of the variables/functions/factors varies one or two of the factors only. Preferably only the effective material thickness or the effect of the specified material forming the sample over the specified emission path length through the sample are varied, particularly where one factor only is varied.

The reduction in the differences between the first relationship value and calculated value may be undertaken so as to reduce the overall difference between all of the first relationship and calculated relationship values involved. The reduction may be intended to minimise the difference. The reduction process may be a minimisation of the sum of the residuals.

Preferably the method is repeated for one or more other samples, the one or more other samples may, with the sample, form a body of material under investigation.

For the correction of source emission energies corresponding to a generator emission energy, preferably the measurement based correction factor alone, i.e. the first relationship, is used.

According to a fourth aspect of the invention we provide apparatus for investigating radioactive sources in a sample, the apparatus comprising:

one or more detectors for emissions from the sources, the detectors generating signals indicative of the emissions detected;

an investigating location into which the sample is introduced;

signal processing means for relating the detector signals to a detected level for the sources;

processing means for correcting the detected level for the sources, according to a correction method, to give a corrected level;

a radioactive emission generator separate from the sample;

one or more detectors for emissions from the generator which leave the sample;

processing means for determining a first relationship, based on the portion of generator emissions entering the sample and the portion of generator emissions leaving the sample;

processing means for calculating a value for a relationship of equivalent type to the first, the calculation being based on functions of an element's absorption of emissions and the amount of that element potentially encountered by emissions, for one or more elements;

processing means for adjusting one or more variables in the calculated relationship to reduce the difference between the value of the determined relationship and the value of the calculated relationship for the sample at a plurality of the energies of emissions from the generator; and calculating means for obtaining the values of the calculated relationship functions from the reduction and calculating the calculated relationship from those factors at the sample source emission energy requiring correction and correcting the detected level using that value.

The processing means may be separate from one another or a common unit in one or more cases, including the calculating means.

The fourth aspect of the invention may include any of the features, options and possibilities set out on the third aspect of the invention, including apparatus suitable for the implementation of the method steps detailed therein.

The first and/or second and/or third and/or fourth aspects of the invention may further include any of the features, options, possibilities and steps set out below.

The sources may be singular or plural in disposition and/or type. The sources may be one or more isotopes of one or more elements. The sources may be alpha and/or beta and/or gamma emitters, both are preferably gamma emitters at least.

One or more sources of the same type and/or of different types may be present in the sample. The sources may be homogeneously distributed, or more usually, unevenly distributed. The size and/or shape and/or mass of a source may be different from the size and/or shape and/or mass of another source in the sample, be they of the same or different types.

The sources may be investigated by detecting one or more of their emitting energies. Thus a characteristic energy of an isotope may be detected.

The sources may be investigated directly, for instance they contribute directly to the detected level, and/or the sources may be investigated indirectly, for instance they do not contribute directly to the detected level but are associated with sources which do.

The samples may be gaseous and/or liquid and/or solid. The samples may contain one or more non-emitting or non-source materials. The materials may include one or more of metals, such as iron, steel, aluminum; wood; glass; plastics, such as polythene, PVC; liquids, such as water.

The sample may be the whole or part of a body of material. The body of material may be free standing, but is preferably contained in a container. The sample may be a part of a body of material, including the part of the container associated with that part of the body of material.

The sample may be a segment or slice through a body of material. Preferably the segment is taken horizontally through the body of material. Preferably the segment has the same thickness throughout the body of material.

Other segments of the body of material may be investigated in subsequent repeats of the method.

The container preferably entirely encloses the body of material. The container may be of metal or of concrete or a combination of such materials. Drums are a particularly preferred container, such as right cylindrical drums.

The containers may be of one or more standard sizes. The height and/or diameter of the containers may be standard.

Preferably the containers introduced to the investigating location one at a time. The containers may be introduced by conveying along a surface, preferably a horizontal surface. The surface may include or be formed of a plurality of rollers. Preferably the container is removed from the investigating location in a manner equivalent to its introduction.

The investigating location is preferably provided in proximity to the emission detector or detectors. The investigating location may be provided in proximity to one or more radioactive sources. The sources are preferably intended to transmit radiation through the sample. Ideally the investigating location is provided between the detector(s) and the transmission source(s).

The sample, preferably the container for it, may be rotated at the investigating location. Preferably the rotation presents different portions of the sample in proximity to the detector (s) and/or transmission source(s). The rotation may be continuous or stepped. The rotation may be provided at between 5 and 25 rpm.

Preferably the sample and/or body of material and/or container are weighed, most preferably at the investigating location, for instance by the turntable used to rotate it.

The sample, preferably the container for it, may be raised and/or lowered at the investigating location. Preferably the rasing and/or lowering presents different portions of the sample to the detector(s) and/or transmission source(s). The raising and/or lower may be continuous or stepped. Preferably investigations are performed as the sample is lower and raised.

The sample may be rotated and/or lower and/or raised.

A single detector may be used. Preferably a plurality of detectors, for instance three, may be used.

The detectors may be of the high purity germanium type.

Preferably the detectors are collimated to restrict their field of view to the body of material of which the sample is the whole or a portion thereof. Where the sample is less than the whole of the body of material, preferably the detectors are collimated to restrict their field of view to the sample only. The sample is preferably a slice or segment of the whole. The segments may be of the same thickness.

Preferably the detected level is obtained from a passive counting stage. Preferably the transmission based investigations are performed before and/or after the passive count stage.

Preferably the transmission source(s) is provided in opposition to the detector(s). Preferably the same number of transmission sources are provided as there are detectors. It is particularly preferred that the transmission source be provided according to nature of the transmission source detailed in the first and/or second aspect of this invention.

One or more surface dosimeters may be provided. Preferably the surface dosimeters are configured to investigate gamma emitting sources. Alpha and/or beta emissions may alternatively or additionally considered.

Preferably the correction method is used in correcting the detected level to the corrected level, for instance by established subsequent techniques, such as those set out in the Los Alamos primer, 2nd Edition, March 1991, ISBN0-16-032724-5.

Various embodiments of the invention will now be described, by way of example only, and with reference to the accompanying drawings in which.

Figure 1:
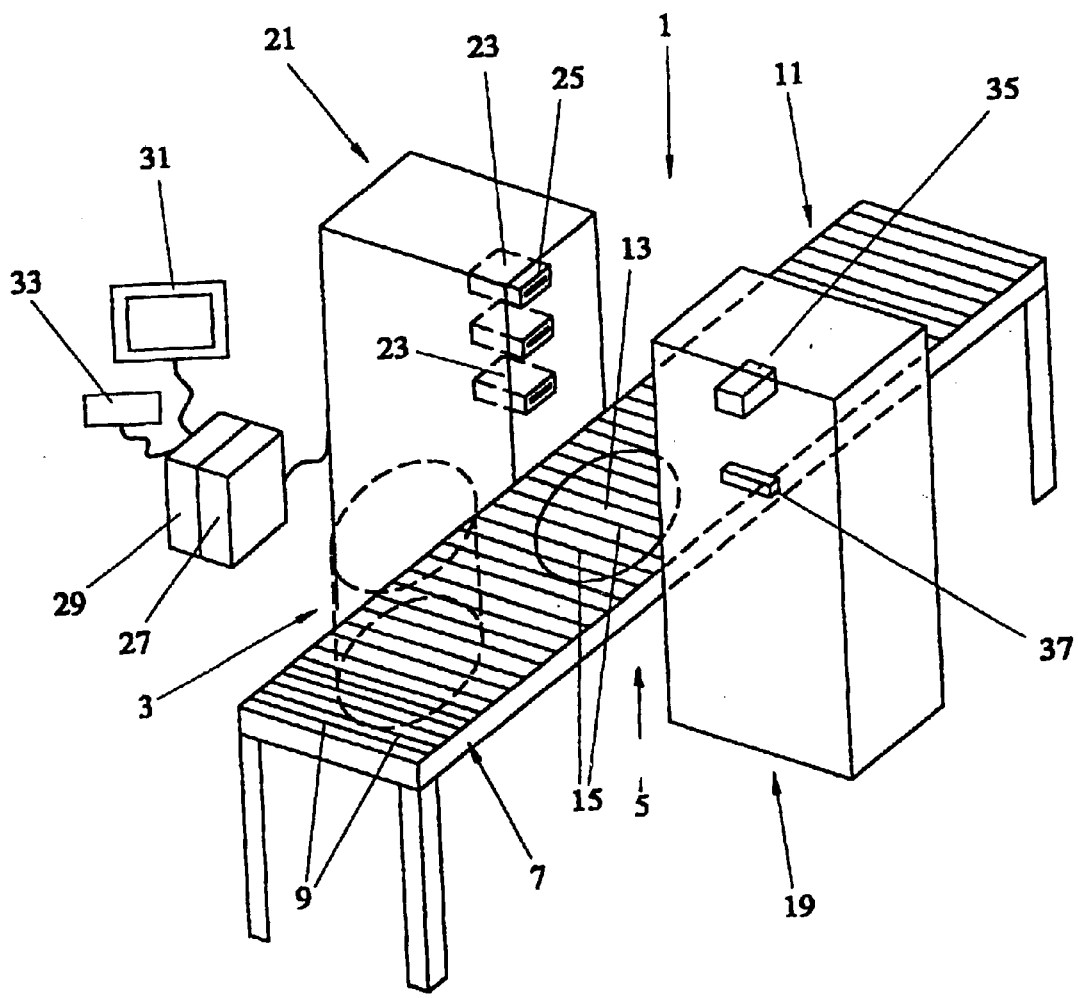
FIG. 1 illustrates schematically an instrument suitable for implementing the present invention.

The instrument illustrated in FIG. 1 is suitable for investigating gamma emission sources in a variety of situations and materials. The system 1 is particularly designed to investigate waste samples presented in drums 3 to investigating location 5.

The drum considered may be in a variety of sizes, but the instrument is readily adapted to consider 100, 200 and 500 liter drums. Masses of waste, such as 40 kg to 550 kg, can readily be accommodated.

The drums 3 may be provided with a barcode which can be examined by a barcode reader on the system 1 so as to permanently assign results obtained to that drum 3.

The system 1 features a conveying table 7 formed of a large number of parallel rollers 9, onto which the drums are lowered. Cranes, forklift trucks and other lifting and manoeuvring means can be used to this end.

The conveying table 7 leads to the investigating location 5 and then onward out the other side to a dismounting location 11 from which the drums 3 are lifted. This set up allows the flow of samples for investigation through the system.

The drum 3 is supported at the investigating location 5 by a turntable 13 which again is formed by a number of parallel rollers 15 mounted on a moveable frame 17. The frame 17 can be rotated about a vertical axis, using a motor (not shown), so as to rotate the drum 3 about its longitudinal axis at the investigating location 5. A rotational rate of 12 rpm is preferred, but stepped rotation can be used. The frame 17 can also be provided with the option of being raised and lowered relative to the level of the surrounding conveying table 7, using electrical drives, hydraulics or other systems (not shown), so as to adjust the vertical positioning of the drum 3 within the investigating location 5. The lowering and rotating motions may be applied simultaneously.

The turntable 13 and frame 17 are configured to weigh the drum 3 whilst it is on the turntable 13.

On either side of the investigating location 5 are investigating assemblies 19, 21. In general one of these assemblies 19 acts as the, optional, transmission side and the other 21 as the detecting/receiving side for the investigations.

The detecting/receiving side 21 provides one or more detectors 23 for the emission type under consideration. The detectors 23 are collimated using shields 25 to give a restricted field of view into the investigating location 5 for each detector 23. Through the use of variable aperture collimators (not shown) the range of radioactivity level for the waste which can successfully be handled is increased. The field of view is generally configured to be a slice through that investigating location 5, the slice being substantially parallel to the turntable 13 and/or perpendicular to the axis of the drum 3 under consideration.

For gamma rays the detectors may be of the germanium type, for instance high purity germanium type. LRGS or HRGS detectors may be used, with electrical or $LN_2$ cooling for HRGS detectors.

The provision of more than one detector, collimated to different fields of view, allows a greater number of measurements to be taken simultaneously, hence increasing the throughput for the system.

The detectors 23 monitor gamma rays originating in their field of view in the drum 3 and in effect generate count rates. A count time of less than 30 minutes is generally employed.

The signals obtained from the detectors are fed to processing electronics 27 and hence to a CPU 29 and operator display 31. Operator control and inputs are facilitated through keyboard 23.

The processing electronics 27 are provided with error handling functions and diagnostic facilities, as well as providing the appropriate calibration functions.

Processing of the signals gives detailed information on the assay of waste material in the drum 3, the isotopic make-up of the waste. More details of these anlyases are discussed below. The results can be used to classify waste according to the relevant disposal categories, including those below a deminimus level which can be characterized as non-radioactive. The results can be expressed as the identification of fission products, activation products or MGA code. The results can also be combined with the "fingerprinting" technique to give non-measurable isotope determinations.

The results obtained can be improved using a variety of potential correction techniques. Correction based on weight and/or differential peak adsorption and/or use of a transmission source may be used. In this invention the new correction techniques detailed in the same applicant's UK Patent Application no. 9900448.3 designated P17453 filed on 11 Jan. 1999 may also be used and details of that technique are fully incorporated herein by reference. This new technique is based on considering the contents of the drum as a number of distinct parts, for instance horizontal segments through the drum, each of the segments being treated separately from the others in terms of its density value. By treating the drum as a number of potentially different density parts the errors referred to above are substantially removed. This division of the drum into segments and allocation of a density value to each segment cannot be made based on the weight of the drum alone.

To achieve the aim the technique evaluates the amount of material in a given segment by means of transmission source based investigations.

If $R_o$ is the rate at which photons from an external source are detected in the absence of the drum and R is the rate of detection of those photons with the drum present then:

$$R=R_o \exp(-\mu\rho x)$$

where $\mu$ is the mass attenuation coefficient, $\rho$ is the density of the sample and x is the thickness of the matrix.

For any given drum x will be constant as this is the path length through the drum (56 cm for a 200 liter drum, for instance). At high gamma energies, say greater than 400 keV, $\mu$ can be treated as effectively constant too. Experimental demonstration of this is provided below. In effect these valid assumptions make $\rho$ proportional to $-\ln(R/R_o)$.

For a given segment or slice, s, through the drum, the amount of material in that slice, $V_s$, is assigned the value $-\ln(R/R_o)$. The total amount of the material present in the drum is thus defined as proportional to $\Sigma V_s$; the sum being for all the slices of the drum.

Following this definition, the fraction of the whole body of material in a given slice, $s_1$, is given by $V_s/\Sigma V_s$. As the total mass of the drum is known (from weighing), as the total volume of the drum is known (from measurement or as a standard size) and as the number of segments into which the drum has been divided is known (from the analysis control), then the density is defined as:

$$\rho=(N \cdot M/V) \cdot (V_s/\Sigma V_s)$$

The provision of more accurate density information specific to each slice allows more accurate attenuation correction for that slice and hence greater overall accuracy.

Through the use of a transmission source or sources 35 on transmission side 19 in combination with stepped rotation of the drum 3 tomographic style investigations of the drum can be made to give plots of density distribution and radioactive distribution for the drum 3.

Surface originating alpha and/or beta emissions, most preferably gamma emissions, for the drum 3 can also be measured using optional dosimeters 37. The dosimeters are normally provided on the transmission side 19 in proximity with the surface of the drum 3.

As discussed above three different known correction techniques may be deployed. The principles and operation behind each of these is now discussed.

Weight based correction seeks to account for the attenuating effects of the body of material the sources are in by a factor based on the body of materials density. The total mass of the entire body of material is divided by the total volume of the body of material, more commonly the total volume of the container for the body, to give an overall density value for the entire body/container. This single value is then used in the correction of the detected count to account for the reduction arising due to attenuation.

Differential peak absorption based correction again seeks to account for the attenuation effects of the material, but through a more direct investigation of attenuation. The gamma emissions from a source anticipated to be in the body of material at two characteristic energies are considered. The ratio of the emissions at one energy to the emissions at the other energy is known (1:1, for instance, for Co-60) without attenuating materials, and this base ratio is compared with the actual ratio measured with the attenuating effects of the body of material present to give a factor relating to the attenuating effect and hence allowing correction.

Transmission source based correction comes in a variety of forms, but each is generally based on determining attenuation effects on emissions from within the body of material by measuring the attenuation on externally sourced gamma emissions. Emissions at a known energy from the transmission source are detected after their passage through the body. The ratio of the detected emissions with the body of material present is compared with the detected emissions which would occur without the material. The attenuation is corrected for based on this difference. The energy of the transmission source is selected to be close to the energy of the emissions from the sample which need correcting.

The prior art transmission correction based techniques present a number of problems or inaccuracies in practice.

The use of a mono-energetic transmission source, as has been deployed to date, renders the correction technique effective to varying degrees for varying waste or sample materials.

The samples under consideration may contain isotopes which emit at a variety of different energies within the spectrum. The energies can be quite low in some instances and high for other instances or be spread across the substantial part of the spectrum.

The mono-energetic sources used to date have been used to determine a correction factor according to the measured effect of the sample on the detected signal for that source following transmission through the sample. The correction factor has been used in relation to all the detected emissions from the sample itself, irrespective of their energy.

In reality the applicant has established that the information gained at that particular energy (and hence the correction factor calculated) are not appropriate across the full width of the spectrum or even a reasonable part thereof. Once away from energies the same as or close to the energy of the mono-energetic source the correction factor becomes inaccurate. Furthermore, the extent and manner of variation of the effects of the sample vary across the spectrum according to the sample characteristics too and as a consequence are not predictable in advance.

To address the problem the present invention employs a multi-energetic source as the transmission source for sample investigation. The sources used are carefully selected to provide energies spanning the important part of the spectrum for a number of commonly encountered waste types. The source material is exemplified by $^{152}$Eu. The intention is to provide a series of transmission based investigations which bracket the emissions from within the sample itself. Thus a more appropriate correction factor can be calculated for the sample in question and its actual emission energies as the deviation of those energies from the energies at which the transmission effects are actually measured and known are significantly reduced.

The overall effect of the multi-energy source is that the correction is more accurate and the likely error is reduced.

The actual correction is obtained from the measured transmission coefficients, which at the respective energies are:

$$\text{Trans. Coeff.} = \frac{R}{R_o} = \exp(-\mu\rho x)$$

where R is the rate of detected photons, $R_o$ is the rate of emitted photons from the source, $\mu$ is the mass absorption coefficient, $\rho$ is the matrix density, x is the matrix thickness.

Measured transmission coefficients for two different samples with significantly different make-ups, at the various energies given by $^{152}$Eu, would give rise to significant variation with energy between the two samples, a variation which would not be apparent from a single investigation at using transmission correction based on a single energy.

Between the greater number of actually measured values provided by the new technique, an extrapolated value can be used. The greater number and range of the measured values make this extrapolation more accurate too.

Over and above this correction technique, which is fully accurate at more points and more accurate at the intervening locations, the present invention offers an optimized technique which makes the correction fully effective at all energies.

As well as addressing the range of energies for which the correction is accurate, the enhanced technique also addresses addition problems with the correction techniques applied in the past, as they only went part way to addressing the variations in sample material. The wastes and other samples which need to be investigated vary significantly between batches of waste and even between individual drums. The waste may be soft waste (approx. 0.1 g.cm$^{-3}$) or metallic and/or ashes and/or cement containing and/or compacted waste (approx. 2.0 g.cm$^{-3}$ or even greater). These variations have significant effects, but the present technique accounts for the unknown material composition to a very large part too.

In addition to the measured transmission coefficients obtained as described above, the technique also deploys fitted transmission coefficients.

In this technique the material forming the sample is assumed to be made up of three or more elements in unknown ratios. The transmission coefficient at energy i is the sum of the exponential terms for each of the constituents, i.e. for j terms. The definition is:

$$T_{nj} = \exp\left(-\sum_j q_j u_{ij}\right)$$

where $q_j$ is the effective matrix thickness for material j and $\mu_{ji}$ is the mass absorption coefficient for material j at energy i.

Three or more materials can be used in the determination, but it is preferred that one low atomic number, and mid atomic number and one high atomic number constituent at least be used (i.e. low Z, mid Z and high Z elements). The elements may be hydrogen (low), aluminum (mid) and iron (high), for instance. It should be noted that the material selected need not be a constituent of the sample for the technique to work.

Using this formula transmission coefficients can be calculated by varying the $q_j$ values. The variations are aimed at minimizing the sum of the residual from a comparison of the measured and calculated/fitted coefficients. The fitting may be a linear least squares approach (matrix solution) or cycling through the possible q values. Once minimized a set of $q_j$ values are reached which can be used to calculate accurately the transmission coefficient at any desired energy i.

In effect the technique assigns a fixed proportion of each composite material to best describe the unknown elemental composition of the sample. The result is an accurate transmission coefficient at any energy and hence full correction at any energy.

Figure 2:
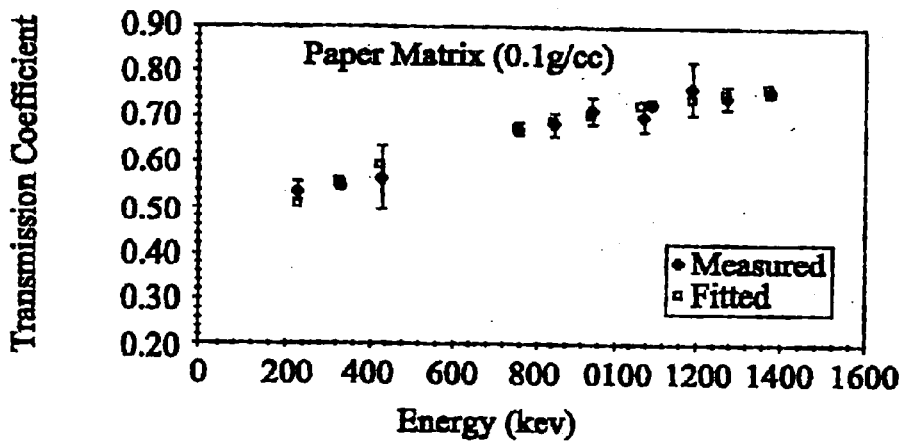
FIG. 2 illustrates coefficients calculated according to one embodiment of the invention for a drum containing a paper matrix (density <0.1 g.cm$^{-1}$)
Figure 3:
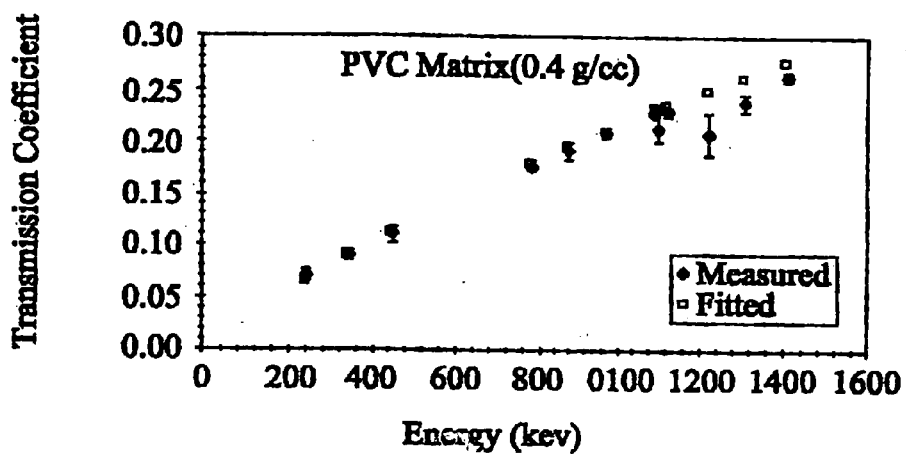
FIG. 3 illustrates measured and fitted transmission coefficients for a PVC matrix (density=0.4 g.cm$^{-3}$)
Figure 4:
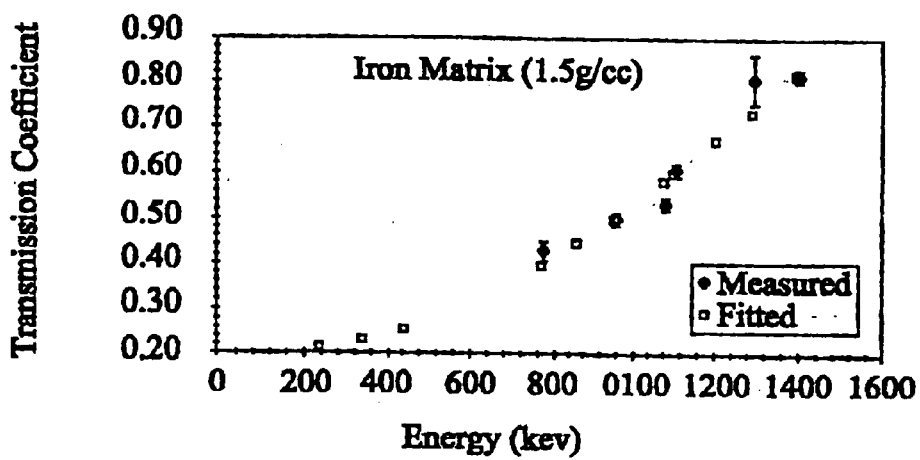
FIG. 4 illustrates measured and fitted transmission coefficients for an iron matrix (density 1.5 g.cm$^{-3}$).

FIG. 2 illustrates measured and fitted transmission coefficients calculated in the above mentioned manner for a 200 liter drum containing a paper matrix (density <0.1 g.cm$^{-3}$), whilst FIG. 3 illustrates measured and fitted transmission coefficients for a PVC matrix (density=0.4 g.cm$^{-3}$) and FIG. 4 illustrates measured and fitted transmission coefficients for an iron matrix (density 1.5 g.cm$^{-3}$).

This additional correction technique offers accurate correction over a wide energy range and also avoids the need for the transmission source to have emission energies which bracket the energy of the isotope of interest (without loss of accuracy) as correction can accurately be extrapolated and compositional assumptions on the sample material are not needed.

The technique described above can be used for a container or drum taken as a whole. However, the technique is adapted to a more accurate and thorough investigation which takes into account likely variations between different parts of the sample.

The technique, improved measured transmission based correction and/or the still more accurate measured and fitted transmission based correction can both be applied to individual slices or other parts of the sample/container by using suitable collimated detector fields of view. In this way density variations in the sample with, for instance height, can be accounted for. Similarly variations in material composition with, for instance height, can be accounted for and partially filled drums can be handled accurately. No assumptions on the compositional make up of the material or its distribution need be made.

The results of the individual parts can be considered separately or in combination to give an overall view point.

What is claimed is:

1. A method of investigating radioactive sources in a sample, the method comprising detecting a portion of the emissions arising from the sample at an energy, the detected portion relating to a detected level, the detected level being corrected according to a correction method to give a corrected level, at that energy, the correction method including:

the provision of an emission generator, passing at least a portion of the emissions of the generator into the sample, detecting at least a portion of the emissions from the generator leaving the sample, and determining a value for a first determined relationship between the two portions;

calculating a value for a relationship of equivalent type to the first determined relationship to provide a calculated relationship, the calculation being based on functions of an element's absorption of emission and the amount of that element potentially encountered by emissions, for one or more elements;

adjusting one or more variables/functions in the caculated relationship to reduce the difference between the value of the first determined relationship and the value of the calculated relationship for the sample at a plurality of the energies of emissions from the generator, so giving a derived calculated relationship; and obtaining the forms of the one or more variables/functions of the derived calculated relationship and using those forms for the variables/functions in the calculation of the value of the calculated relationship at the sample source emission energy or energies requiring correction and correcting the detected level using those values for the calculated relationship.

2. A method according to claim 1 in which the generator emissions are of at least two emission energies and at least two of those energies are detected.

3. A method according to claim 1 in which the calculated relationship is based on functions addressing one or more of the density, emission path length in the sample and sample absorption of emissions.

4. A method according to claim 1 in which the calculated relationship is based on functions addressing one or both of the effect of the material forming the sample over the emission path length in the sample and the sample absorption of emissions.

5. A method according to claim 1 in which the caculated relationship is based on he equation:

$$T_i = \exp{-\Sigma q_j \cdot \mu_{i,j}}$$

where $T_i$ is the transmission coefficient at the energy i under consideration; $q_j$ is the effective material thickness or the effect of the specified material forming the sample over the specified emission path length through the sample, for element j; $\mu_{i,j}$ is the mass absorption coefficient for elements j at energy i.

6. A method according to claim 5 in which the calculated relationship includes contributions from three or more elements, j.

7. A method according to claim 5 in which the elements include at least two low atomic mass element, at least one high atomic mass element, and at least one intermediate atomic mass element.

8. A method according to claim 7 in which the at least one low atomic mass element has a mass of less than 10, the at least one high atomic mass element has a mass greater than 40, and the at least one intermediate atomic mass element has a mass between 10 and 50.

9. A method according to claim 1 in which the adjusting of the variables/functions varies one or two of the variables/functions only.

10. A method according to claim 1 in which the reduction in the differences between the first relationship value and calculated value is undertaken so as to reduce the overall difference between all of the first relationship and calculated relationship values involved.

11. A method according to claim 1 in which the first relationship employs measured transmission coefficients.

12. A method according to claim 11 in which the measured transmission coefficients, for one or more of the energies are provided according to the equation:

$$\text{Trans. Coeff.} = \frac{R}{R_o}$$

where R is the rate of detected photons with the sample in a measurement place such that at least a portion of the emissions from the generator pass into the sample before being detected by the detector, $R_o$ is the rate of photons which would be detected without the sample in the measurement place.

13. A method according to claim 1 in which the emission energies of the generator extend across a substantial portion of the range of energies emitted from the sample.

14. A method according to claim 13 in which a substantial portion is 50% of the range of energies emitted from the sample.

15. A method according to claim 1 in which the generator emits energies encompassing the range of energies emitted by the sample.

16. A method according to claim 1 in which at least 5 energies from the generator are detected and used.

17. Apparatus for investigating radioactive sources in a sample, the apparatus comprising:

one or more detectors for detecting emissions from the sources, the detectors generating signals indicative of the emissions detected;

an investigating location into which the sample is introduced;

signal processing means of relating the detector signals to a detected level for the sources;

processing means for correcting the detected level for the sources, according to a correction method, to give a corrected level;

a radioactive emission generator separate from the sample;

one or more detectors for detecting emissions from the generator which leave the sample;

processing means for determining a value for a first determined relationship, based on the portion of generator emissions entering the sample and the portion of generator emissions leaving the sample;

processing means for calculating a value for a relationship of equivalent type to the first determined relationship to provide a calculated relationship, the calculation being based on functions of an element's absorption of emissions and the amount of that element potentially encountered by emissions, for one or more elements;

processing means for adjusting one or more variable/ functions in the calculated relationship to reduce the difference between the value of the first determined relationship and the value of the calculated relationship for the sample at a plurality of the energies of emissions from the generator, so giving a derived calculated relationship; and calculating means for obtaining the forms of the one or more variables/functions of the derived calculated relationship and using those forms for the variables/ functions in the calculation of the value of the calculated relationship at the sample source emission energy requiring correction and correcting the detected level using that value.

\* \* \* \* \*